United States Patent
Ciechomski et al.

(10) Patent No.: US 8,475,055 B2
(45) Date of Patent: Jul. 2, 2013

(54) HYBRID CONNECTOR

(75) Inventors: Tomasz A. Ciechomski, Lowicz (PL); Joanna M. Polus, Lodz (PL); Tadeusz M. Tenderenda, Warsaw (PL)

(73) Assignee: CCS Technology, Inc., Wilmington, DE (US)

( * ) Notice: Subject to any disclaimer, the term of this patent is extended or adjusted under 35 U.S.C. 154(b) by 8 days.

(21) Appl. No.: 13/130,337

(22) PCT Filed: Nov. 13, 2009

(86) PCT No.: PCT/US2009/064457
§ 371 (c)(1),
(2), (4) Date: Nov. 1, 2011

(87) PCT Pub. No.: WO2010/065268
PCT Pub. Date: Jun. 10, 2010

(65) Prior Publication Data
US 2012/0039571 A1    Feb. 16, 2012

(30) Foreign Application Priority Data

Nov. 25, 2008 (EP) .................................. 08020424.1

(51) Int. Cl.
 *G02B 6/36* (2006.01)
 *H04B 10/00* (2006.01)
(52) U.S. Cl.
 USPC ................. 385/78; 385/76; 385/53; 385/101; 385/65; 439/577

(58) Field of Classification Search
 USPC .................. 385/100, 101, 53, 60, 52, 65, 76, 385/77, 78; 439/577
 See application file for complete search history.

(56) References Cited

U.S. PATENT DOCUMENTS

| | | | | |
|---|---|---|---|---|
| 4,775,212 A * | 10/1988 | Smith | ........................... | 385/101 |
| 5,109,452 A * | 4/1992 | Selvin et al. | .................... | 385/69 |
| 5,140,659 A * | 8/1992 | Minds et al. | .................... | 385/66 |
| 6,637,949 B2 * | 10/2003 | Loch et al. | ...................... | 385/92 |
| 6,821,031 B2 * | 11/2004 | Loch et al. | ...................... | 385/92 |
| 6,840,795 B1 * | 1/2005 | Takeda et al. | ................. | 439/492 |
| 7,153,040 B2 * | 12/2006 | Loch et al. | ...................... | 385/92 |
| 8,283,565 B2 * | 10/2012 | Yagisawa et al. | ............. | 174/254 |
| 2005/0265672 A1 * | 12/2005 | Theuerkorn et al. | .......... | 385/100 |
| 2012/0039571 A1 * | 2/2012 | Ciechomski et al. | ........... | 385/78 |

* cited by examiner

*Primary Examiner* — Brian Healy

(57) ABSTRACT

The disclosure relates to a connector for simultaneously connecting optical fibers and copper conductors, comprising two connector parts (11, 12) which can be fitted together, a first connector part (11) being assigned to a tether cable (13), in which first optical fibers, branched off from a riser cable (14) by means of a furcation adapter, and first copper conductors, likewise branched off from a riser cable (14), are run, a second connector part (12) being assigned to a distribution cable (15), in which second optical fibers and second copper conductors are run, it being possible for the first optical fibers and the second optical fibers as well as the first copper conductors and the second copper conductors to be connected by fitting the two connector parts (11, 12) together, and a hollow-like cutout with a contour that is adapted to the contour of the riser cable (14) being respectively formed both on an underside of a housing of the first connector part (11) and on an underside of a housing of the second connector part (12).

12 Claims, 9 Drawing Sheets

Fig. 8

HYBRID CONNECTOR

RELATED APPLICATIONS

This application is a 371 of International Application PCT/US09/64457 filed Nov. 13, 2009, which claims the benefit of priority to European Patent Application No. 08020424.1 filed Nov. 25, 2008, both applications being incorporated herein by reference.

FIELD

The disclosure relates to a hybrid connector for simultaneously connecting optical fibers and copper conductors. More specifically, the disclosure relates to a receptable connector part and to a plug connector part of such a connector for simultaneously connecting optical fibers and copper conductors.

BACKGROUND

It is already known from practice to use so-called furcation adapters to branch off optical fibers running in a so-called riser cable from the riser cable at defined positions of said riser cable and transfer them in the area of each furcation adapter into a tether cable. The optical fibers transferred into the respective tether cables are in each case a fraction of the optical fibers running in the riser cable, the optical fibers running in the tether cables having to be connected to optical fibers that are run in distribution cables. The connecting of the optical fibers run in the tether cables to the optical fibers run in the distribution cables can take place for example by way of connectors. In this case, the connectors then serve for connecting the first optical fibers, running in the tether cables, to the second optical fibers, running in the distribution cables.

There are known applications in which not only optical fibers but also copper conductors have to be run in the riser cable, the tether cables and the distribution cables, both the optical fibers and the copper conductors then having to be connected to one another by way of a connector. An application in which both optical fibers and copper conductors have to be run in the riser cable, the tether cables and the distribution cables is, for example, known as "radio over fiber" with distributed antenna systems.

In the case of so-called "radio over fiber", a broadband radio signal is transmitted over the optical fibers to antenna units, which convert the optical signal into an RF signal, it being necessary for the purpose of supplying power to the antenna units for the above cables not only to be used for running the optical fibers, which serve for the transmission of the optical broadband radio signal, but also to be used for running copper conductors, which ultimately serve for supplying power to the antenna units.

In practice, when both optical fibers and copper conductors have to be connected to one another in such an application, separate connectors are used for connecting the optical fibers and for connecting the copper conductors. Handling the cables and the connectors then presents difficulties in particular when the cables are laid in cable ducts of narrow dimensions.

SUMMARY

The connector disclosed simultaneously connects optical fibers and copper conductors comprises two connector parts, namely a receptable connector part and a plug connector part, the plug connector part fitting into the receptable connector part during mating said two connector parts, one of said two connector parts being assigned to a first cable, especially to a tether cable, in which first optical fibers, branched off from a second cable, especially from a riser cable, by means of a furcation adapter, and first copper conductors, likewise branched off from said second cable, are run, the other of said two connector parts being assigned to a third cable, especially to a distribution cable, in which second optical fibers and second copper conductors are run, it being possible for the first optical fibers and the second optical fibers as well as the first copper conductors and the second copper conductors to be connected by fitting the two connector parts together during mating, and a hollow-like cutout with a contour that is adapted to the contour of the second cable being respectively formed both on an underside of a housing of the receptable connector part and on an underside of a housing of the plug connector part.

With the connector disclosed, optical fibers and copper conductors can be simultaneously connected to one another. It is therefore no longer necessary to keep separate connectors for connecting the optical fibers and for connecting the copper conductors.

In addition, a hollow-like cutout with a contour that is adapted to the contour of the cable from which optical fibers and copper conductors are branched off is formed on the underside of the housing of the two connector parts of the connector. This makes it possible to align the connector that serves for simultaneously connecting optical fibers and copper conductors and said cable in relation to each other in a compact, space-saving arrangement and to handle them in this arrangement, so that even handling of the unit comprising the cables and the connector in cable ducts of narrow dimensions is possible without any problems.

DETAILED DESCRIPTION

Reference is now made in detail to example embodiments of the disclosure, examples of which are illustrated in the accompanying drawings. Whenever possible, the same or like reference numbers and symbols are used throughout the drawings to refer to the same or like elements or components.

Figure 1:
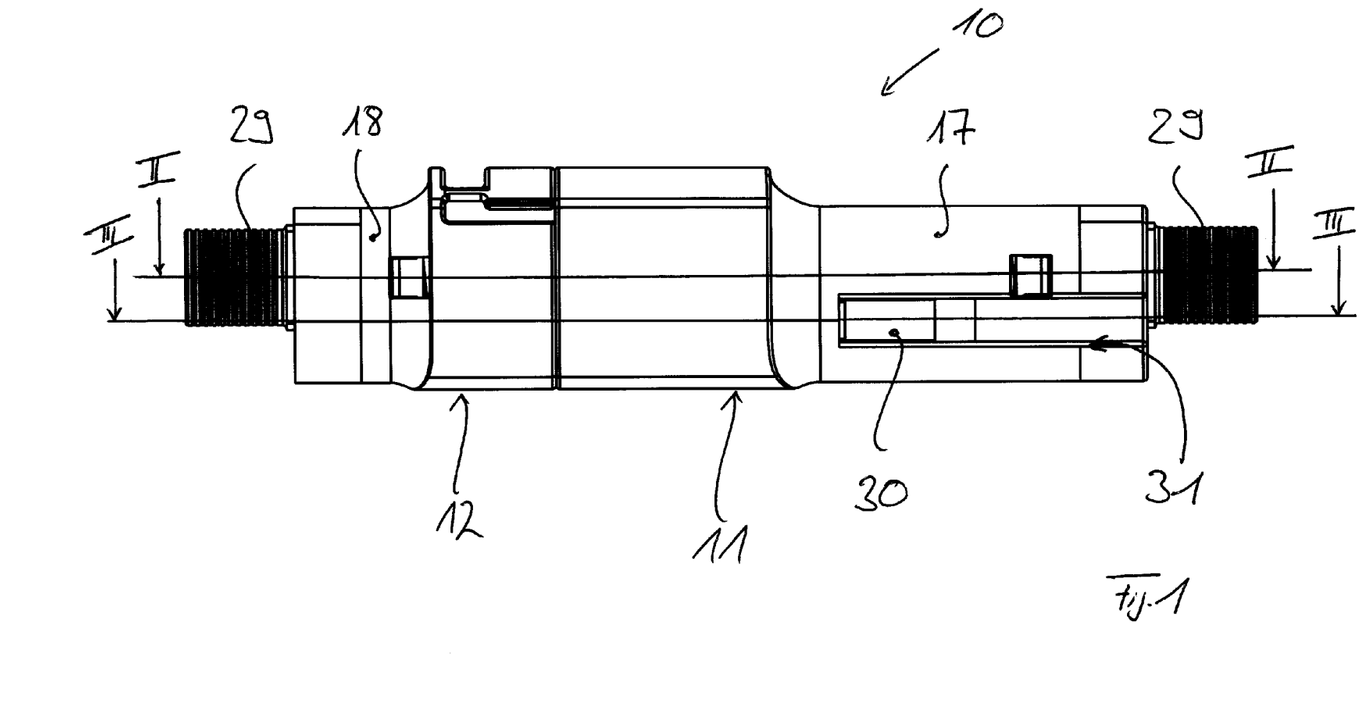
FIG. 1 shows a side view of a hybrid connector.
Figure 2:
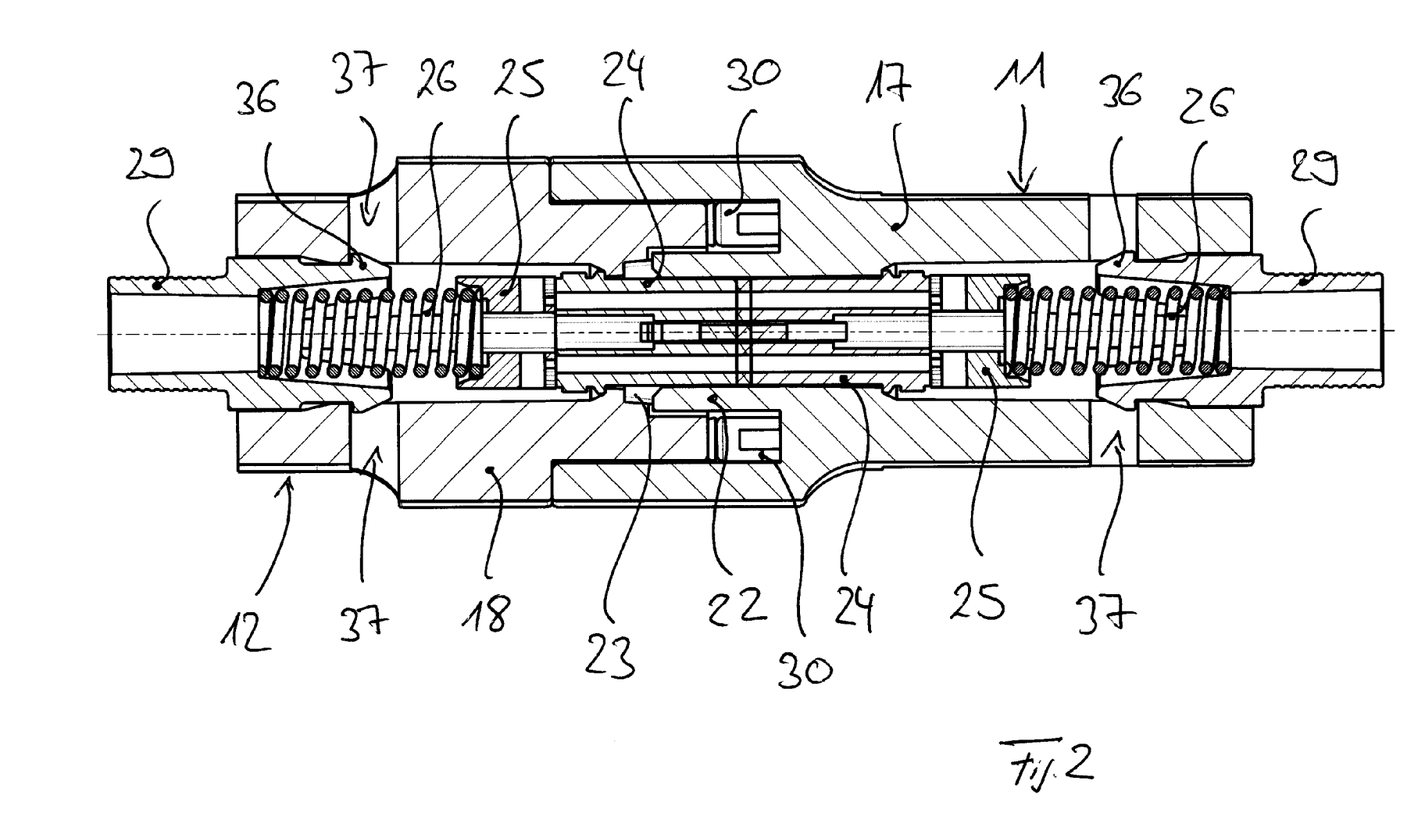
FIG. 2 shows a cross section through the connector of FIG. 1 along the sectional direction II-II according to FIG. 1.
Figure 9:
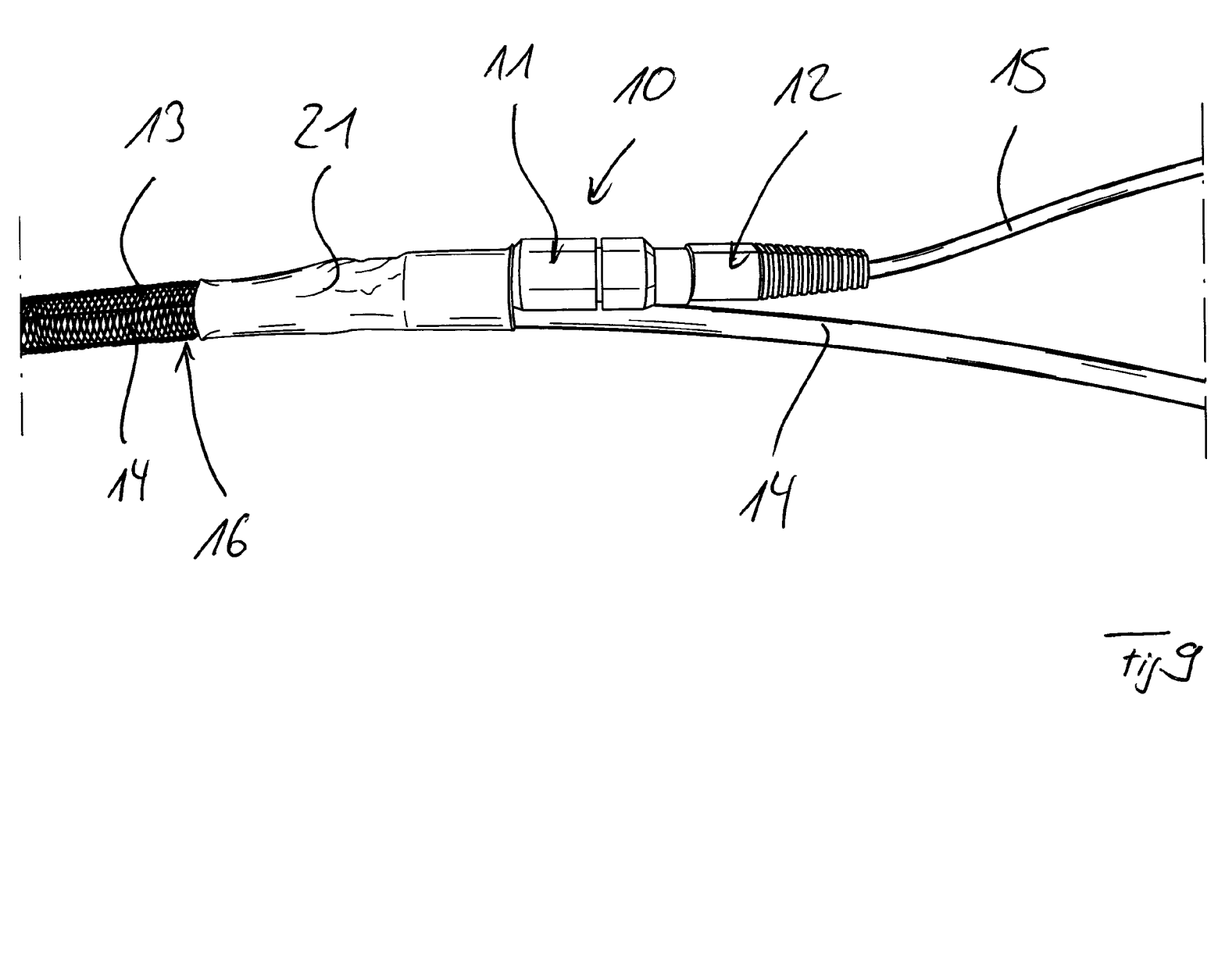
FIG. 9 shows the connector of FIG. 1 together with cables.

FIG. 1 shows a connector 10 for simultaneously connecting optical fibers and copper conductors. The connector 10 comprises two connector parts 11 and 12, a receptable connector part 11 being assigned to a first cable, especially to a tether cable 13, in which first optical fibers and first copper conductors are run, being branched off from a second cable, especially from a riser cable 14, by means of a furcation adapter (not shown). A plug connector part 12 is assigned to a third cable, especially to a distribution cable 15, in which second optical fibers and second copper conductors are run, it being possible by way of the connector disclosed for the first optical fibers of the tether cable 13 to be connected to the second optical fibers of the distribution cable 15 and for the first copper conductors of the tether cable 13 to be connected to the second copper conductors of the distribution cable 15. In FIG. 9, the riser cable 14 and the tether cable 13 branched off from the riser cable accordingly run on the left-hand side of the connector 10, the same cables being surrounded by a tube 16 in FIG. 9. The riser cable 14 and the distribution cable 15 run on the right-hand side of the connector in FIG. 9.

Figure 8:
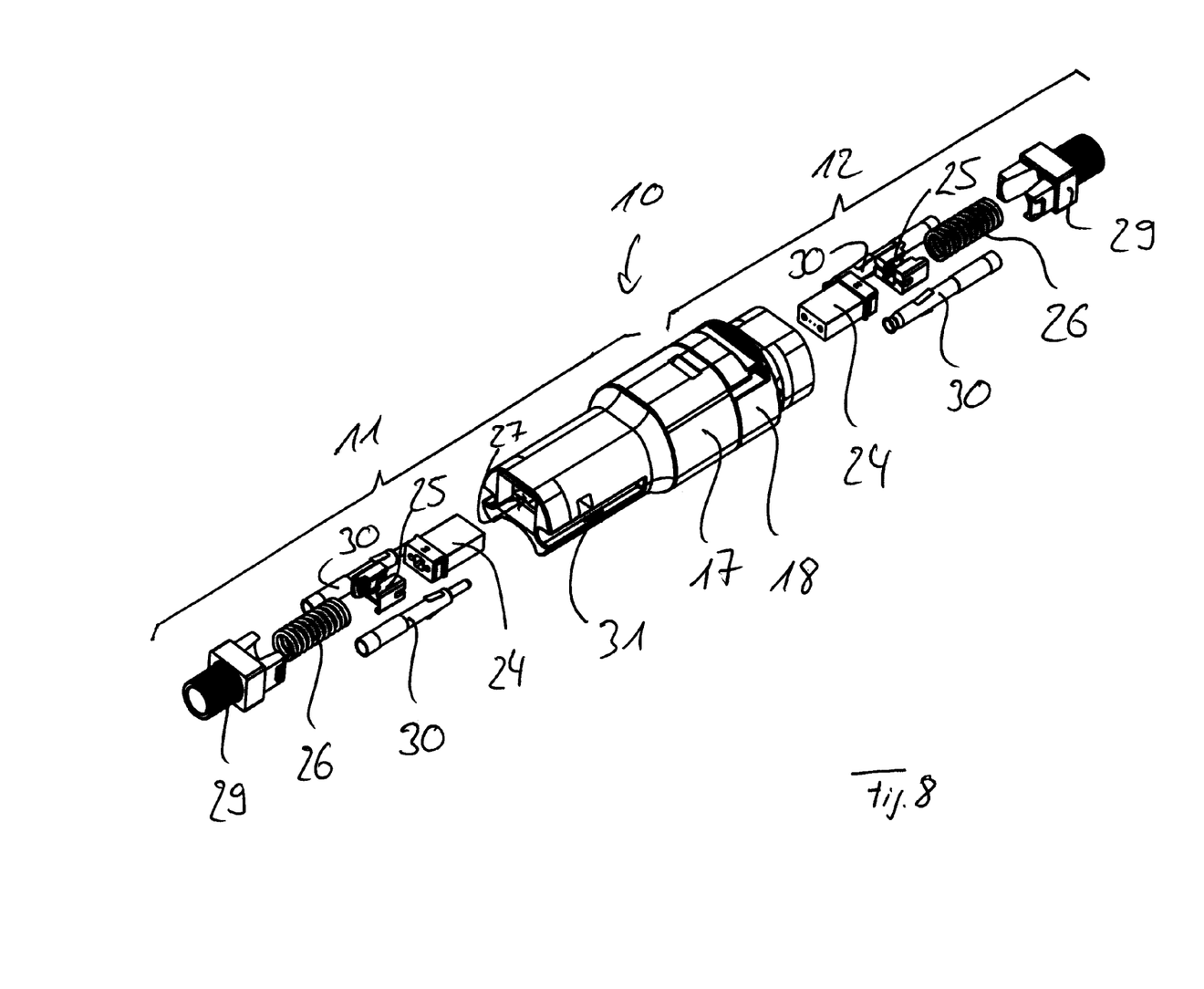
FIG. 8 shows the connector of FIG. 1 in an exploded representation.

FIG. 8 shows an exploded representation of the connector 10, to be specific the two connector parts 11, 12 of the same, the two connector parts 11, 12 in each case comprising a housing 17 and 18, respectively, in which connecting elements on the one hand for optical fibers and on the other hand for copper conductors are accommodated. These connecting elements for the optical fibers and copper conductors are discussed in detail further below.

According to FIGS. 4 to 7, formed both on an underside of the housing 17 of the connector part 11 and on an underside of the housing 18 of the connector part 12 there is in each case a hollow-like cutout 19 and 20, respectively. The contours of the hollow-like cutouts 19, 20 are in this case adapted to the contour of the riser cable 14 shown in FIG. 9, so that during assembly the riser cable 14 engages at least over some sections in the hollow-like cutouts 19, 20 on the underside of the housings 17 and 18 of the two connector parts 11 and 12 of the connector 10.

As a result, the connector 10 can be assembled in a particularly space-saving manner on the riser cable 14, so that the unit comprising the riser cable 14 and the connector 10 can be handled without any problems, even in narrow cable ducts.

According to FIG. 9, the tube 16 comprises a heat shrinkable section 21, which in the assembled state according to FIG. 9 encloses the riser cable 14, the tether cable 13 and the connector part 11 of the connector 10, at least over some sections, and in the heat-shrunk state keeps the tether cable 14 in the cutout 19 of the housing 17 of the connector part 11.

The receptable connector part 11 and the plug connector part 12 can be connected to one another directly and without an adapter. Accordingly, no adapter has to be positioned between the receptable connector part 11 and the plug connector part 12 to connect them. For this purpose, one of the two connector parts, to be specific in the exemplary embodiment shown the receptable connector part 11 (see FIGS. 6, 7), is assigned a number of guide pins 22, which engage in corresponding guide grooves 23 of the other connector part, in the exemplary embodiment shown the plug connector part 12, when the two connector parts 11 and 12 are fitted together. The interaction of these guide pins 22 with the guide grooves 23 allows the two connector parts 11, 12 to be aligned exactly with each other when they are fitted together.

As already stated, both the receptable connector part 11 and the plug connector part 12 comprise connecting elements for the optical fibers and connecting elements for the copper conductors. According to FIG. 8, the connecting elements for the optical fibers of the two connector parts 11, 12 in each case comprise a ferrule 24, which can be exposed to the spring force of a spring element 26 by way of a holding means 25.

The ferrules 24, holding means 25 and spring elements 26 are accommodated in passageways 27 and 28, respectively, which are provided in a central section of the housings 17, 18 of the two connector parts 11, 12, the ferrules 24, holding means 25 and spring elements 26 being fixed in the passageways 27 and 28 in each case by way of a crimp body 29.

The crimp bodies 29 have barb-like anchoring elements 36, which engage in bores 37 of the housing 17, 18, it being possible for the crimp bodies 29 to be released for disassembly by way of the externally accessible bores 37. In the fitted-together state of the two connector parts 11, 12 of the connector 10, the two ferrules 24, to be specific free ends of the same, are pressed together by way of the spring elements 26. The ferrules 24 that are used are so-called MT ferrules, preferably mini-MT ferrules.

In addition to the connecting elements for the optical fibers, each connector part 11, 12 of the connector also comprises connecting elements 30 for copper conductors, the connecting elements 30 for the copper conductors being accommodated in conductor passageways 31 and 32 of the housings 17 and 18, respectively, of the two connector parts 11, 12, which are positioned laterally alongside the passageways 27, 28, which serve for accommodating the connecting elements for the optical fibers. According to FIGS. 4 and 5, the conductor passageways 32 in the housing 18 of the connector part 12 are in this case interrupted in such a way that the connecting elements 30 guided in the same for the copper conductors can be fixed to the housing 18 of the connector part 12 by way of barb-like anchoring elements 33.

Figure 3:
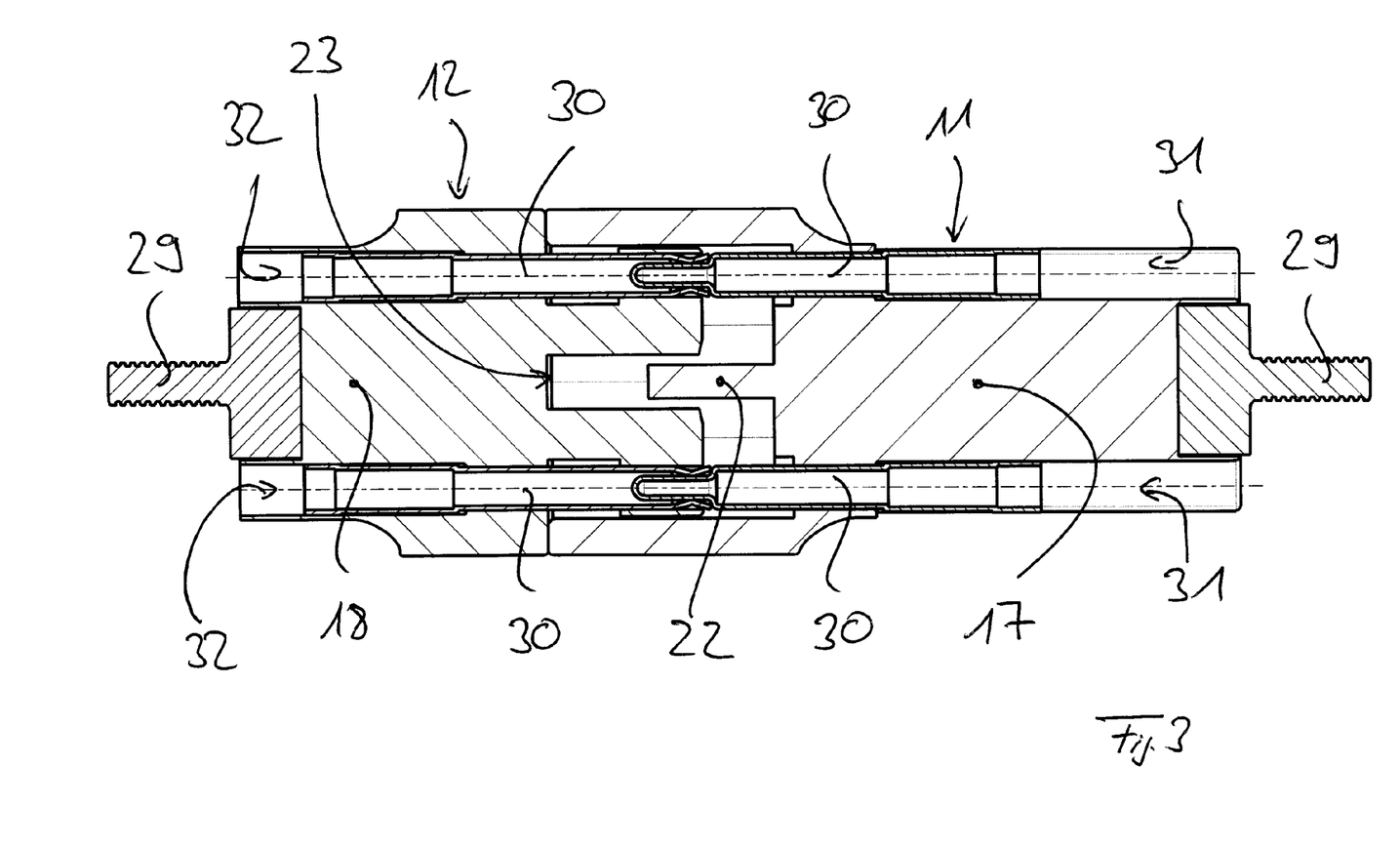
FIG. 3 shows a cross section through the connector of FIG. 1 along the sectional direction III-Ill according to FIG. 1.
Figure 4:
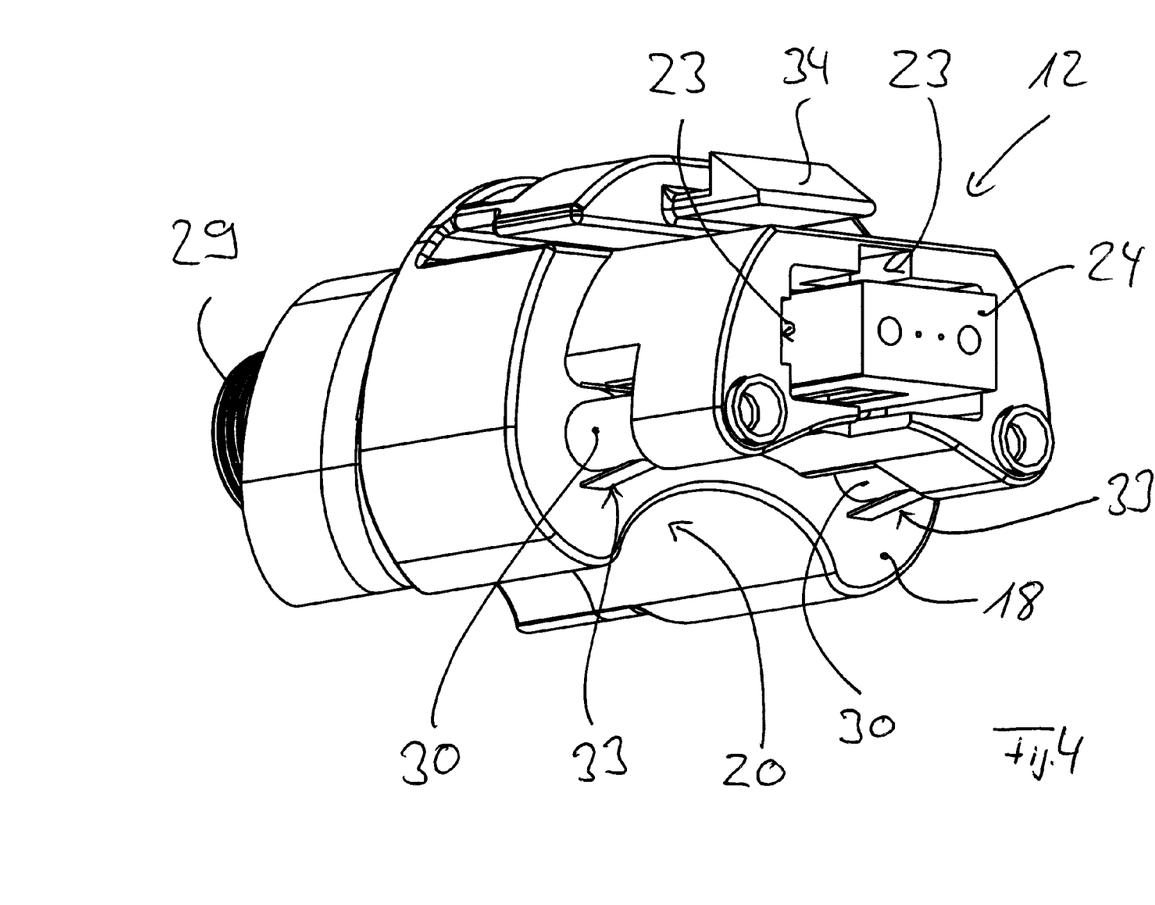
FIG. 4 shows a perspective view of a first connector part of the connector of FIG. 1.
Figure 5:
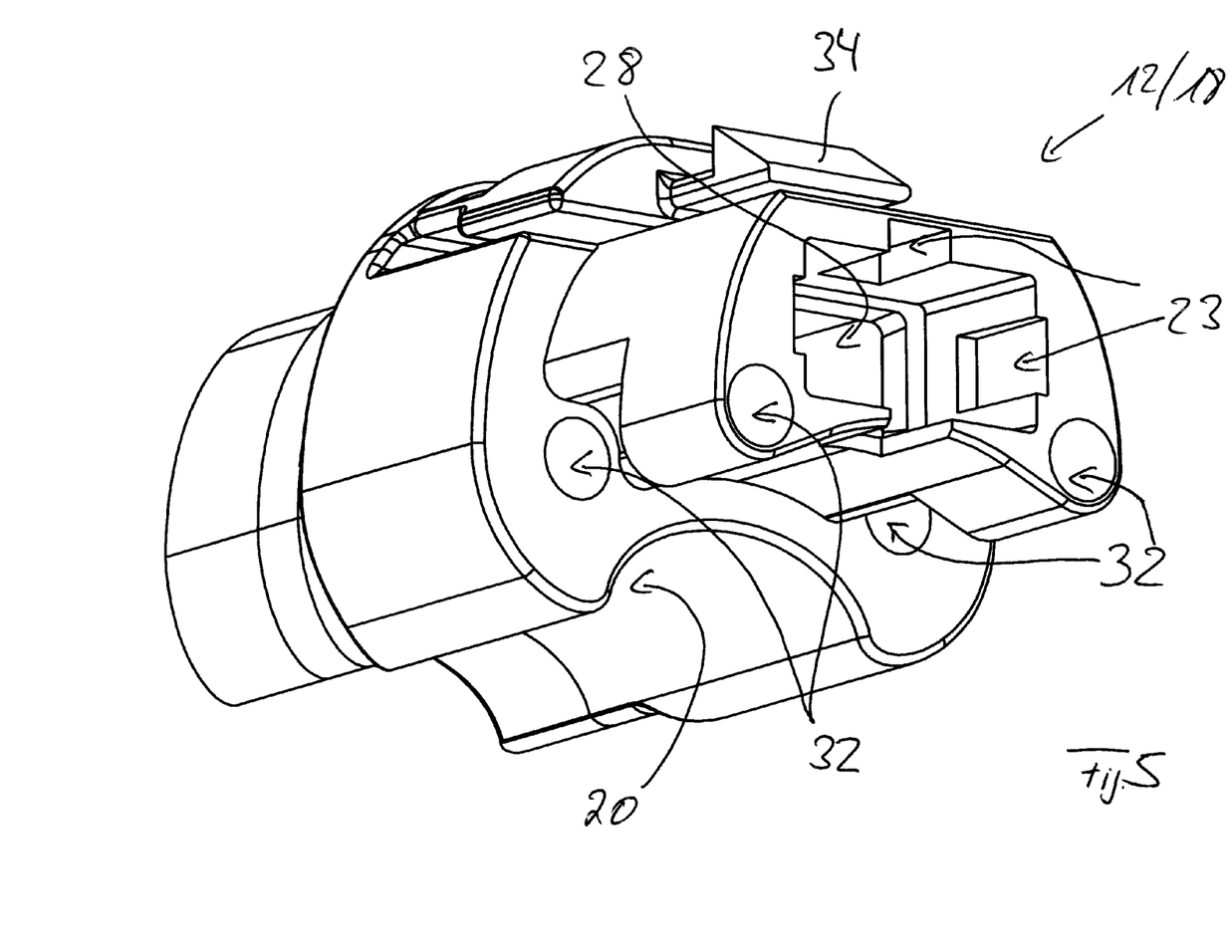
FIG. 5 shows a housing of the connector part of FIG. 4.
Figure 6:
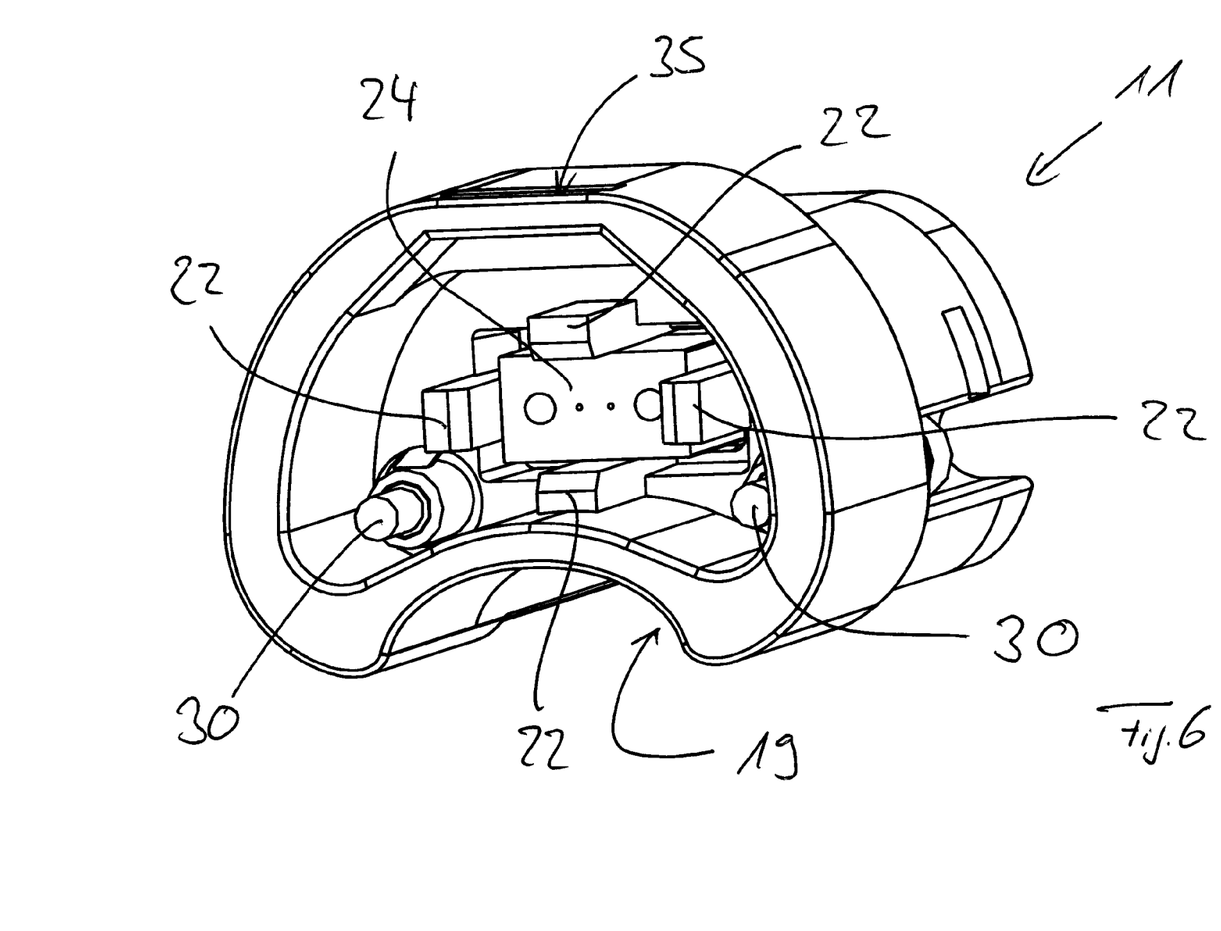
FIG. 6 shows a perspective view of a second connector part of the connector of FIG. 1.
Figure 7:
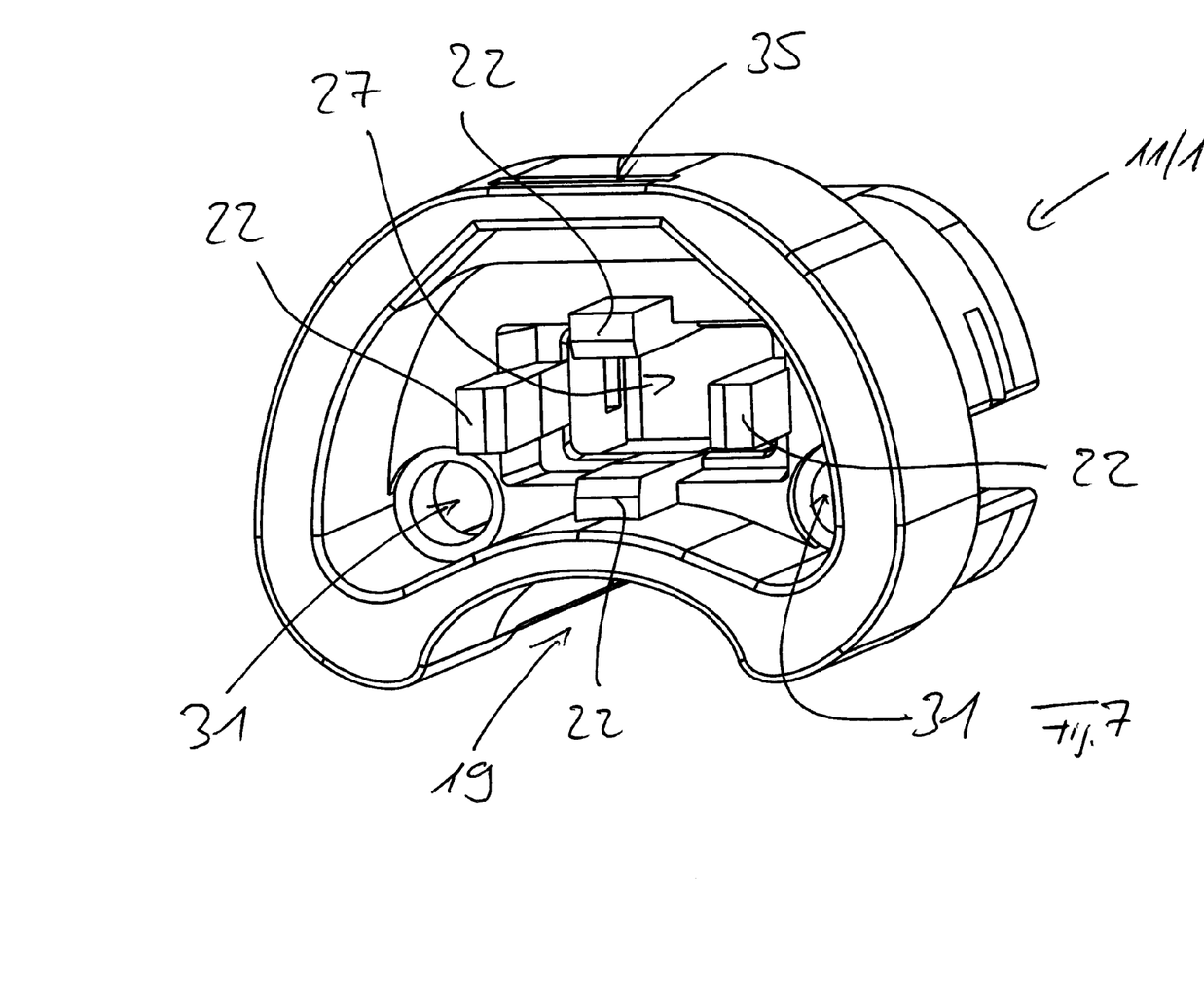
FIG. 7 shows a housing of the connector part of FIG. 6.

In the fitted-together state of the two connector parts 11, 12 of the connector 12, free ends of the connecting elements 30 for the copper conductors are fitted into one another, as can best be seen from FIG. 3.

The two connector parts 11, 12 of the connector 10 are held together in the fitted-together state by a barb-like anchoring element 34, which in the exemplary embodiment shown is assigned to the connector part 12, engaging in a corresponding cutout 35 of the connector part 11.

As shown in the preferred embodiment, the receptable connector part 12 is assigned to the first cable, especially to the tether cable 13, and the plug connector part 12 is assigned to the third cable, especially to the distribution cable 15. It is also possible that the receptable connector part 12 is assigned to the third cable, especially to the distribution cable 15, and the plug connector part 12 is assigned to the first cable, especially to the tether cable 13.

We claim:

1. A connector for simultaneously connecting optical fibers and copper conductors, comprising two connector parts, namely a receptable connector part and a plug connector part, the plug connector part fitting into the receptable connector part during mating said two connector parts, one of said two connector parts being assigned to a first cable, in which first optical fibers, branched off from a second cable by means of a furcation adapter, and first copper conductors, likewise branched off from said second cable, are run, the other of said two connector parts being assigned to a third cable, in which second optical fibers and second copper conductors are run, it being possible for the first optical fibers and the second optical fibers as well as the first copper conductors and the second copper conductors to be connected by fitting the two connector parts together during mating, and a hollow-like cutout with a contour that is adapted to the contour of the second cable being respectively formed both on an underside of a housing of the receptable connector part and on an underside of a housing of the plug connector part.

2. The connector as claimed in claim 1, wherein one of said two connector parts is fastened on the second cable by way of a heat shrinkable tube, which encloses the connector part, the first cable and the second cable over some sections, the second cable thereby protruding, at least over some sections, into the hollow-like cutout on the underside of the housing of the connector part.

3. The connector of claim 1, wherein the two connector parts can be connected to one another directly and without an adapter, for this purpose one of the connector parts having a number of guide pins, which engage in corresponding guide grooves of the other connector part when the two connector parts are fitted together.

4. The connector of claim 1, wherein the two connector parts each have in a central section connecting elements for the first optical fibers and the second optical fibers, each connector part respectively comprising a ferrule, the free ends of which are pressed together by way of spring elements when the connector parts are fitted together.

5. The connector of claim 4, wherein the ferrules are multifiber ferrules.

6. The connector of claim 4, wherein the ferrules and spring elements are accommodated in passageways which are provided in the central section of the housings of the two connector parts, the ferrules and spring elements being fixed in the passageways by way of a crimp bodies, said crimp bodies have anchoring elements which engage in bores of the housing.

7. The connector of claim 3, wherein the two connector parts each have in lateral sections, which are positioned alongside the respective central section, connecting elements for the first copper conductors and the second copper conductors, the free ends of which elements are fitted into one another when the connector parts are fitted together.

8. The connector of claim 7, wherein the connecting elements for the copper conductors being accommodated in conductor passageways of the housings of the two connector parts, wherein a conductor passageway in at least one of said housings being interrupted in such a way that the connecting elements guided in the same can be fixed to the housing of said connector part by way of anchoring elements.

9. A receptable connector part of a connector for simultaneously connecting optical fibers and copper conductors, said receptable connector part being able to receive a plug connector part of said connector, a hollow-like cutout with a contour that is adapted to the contour of a cable being formed on an underside of a housing of the receptable connector part.

10. The receptable connector part of claim 9, wherein said hollow-like cutout being formed on an underside of the housing of the receptable connector part has a contour that is adapted to the contour of a cable from which optical fibers and copper conductors are branched of into a cable to which the receptable connector part or the plug connector part is assigned.

11. A plug connector part of a connector for simultaneously connecting optical fibers and copper conductor, said plug connector part fitting into a receptable connector part of said connector, a hollow-like cutout with a contour that is adapted to the contour of a cable being formed on an underside of a housing of the plug connector part.

12. The plug connector part of claim 11, wherein said hollow-like cutout being formed on an underside of a housing of the plug connector part has a contour that is adapted to the contour of a cable from which optical fibers and first copper conductors are branched of into a cable to which the receptable connector part or the plug connector part is assigned.

* * * * *